United States Patent
Lei et al.

(10) Patent No.: US 11,710,401 B2
(45) Date of Patent: Jul. 25, 2023

(54) SYNCHRONIZED WORK ZONE TRAFFIC MANAGEMENT SYSTEMS AND METHODS

(71) Applicant: Ford Global Technologies, LLC, Dearborn, MI (US)

(72) Inventors: Oliver Lei, Windsor (CA); Somak Datta Gupta, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 17/384,600

(22) Filed: Jul. 23, 2021

(65) Prior Publication Data

US 2023/0024186 A1    Jan. 26, 2023

(51) Int. Cl.
*G08G 1/0955* (2006.01)
*G08G 1/01* (2006.01)
(Continued)

(52) U.S. Cl.
CPC ........... *G08G 1/0955* (2013.01); *B60W 50/14* (2013.01); *G08G 1/0141* (2013.01);
(Continued)

(58) Field of Classification Search
None
See application file for complete search history.

(56) References Cited

U.S. PATENT DOCUMENTS

| 5,252,969 A * | 10/1993 | Kishi | G08G 1/0955 340/908 |
| 8,319,662 B1 * | 11/2012 | Bontemps | G08G 1/0955 340/908 |

(Continued)

FOREIGN PATENT DOCUMENTS

| CA | 2343435 C * | 12/2006 | G08G 1/081 |
| CA | 2731535 A1 * | 8/2011 | G09F 9/33 |

(Continued)

OTHER PUBLICATIONS

Atssa, "Field Guide for the Use and Placement of Shadow Vehicles in Work Zones", Developed by ATSSA (American Traffic Safety Services Association), U.S. Department of Transportation Federal Highway Administration, 15 pages.

(Continued)

*Primary Examiner* — Kevin R Steckbauer
(74) *Attorney, Agent, or Firm* — Frank Lollo; Eversheds Sutherland (US) LLP

(57) ABSTRACT

Synchronized work zone traffic management systems and methods are disclosed herein. An example method includes synchronizing, by a first vehicle, communication with a second vehicle over a wireless link, and displaying alternatingly, by the first vehicle, one of two messages on a first external display according to an alternating schema. A first message indicates to drivers to drive slowly and a second message indicates to the drivers to stop. The first message being displayed on the first external display when the second vehicle is displaying the second message on a second external display. The first vehicle displaying the second message on the first external display when the second vehicle is displaying the first message on the second external display. The alternating displaying of the first and second messages being used to control flow of traffic on a one-way street.

17 Claims, 4 Drawing Sheets

(51) Int. Cl.
  *H04W 4/46* (2018.01)
  *B60W 50/14* (2020.01)
  *G08G 1/08* (2006.01)
  *G08G 1/087* (2006.01)
  *G08G 1/07* (2006.01)

(52) U.S. Cl.
  CPC ............ *G08G 1/0145* (2013.01); *G08G 1/08* (2013.01); *G08G 1/087* (2013.01); *H04W 4/46* (2018.02); *B60W 2050/146* (2013.01); *G08G 1/07* (2013.01)

(56) References Cited

U.S. PATENT DOCUMENTS

| | | | | |
|---|---|---|---|---|
| 9,990,846 | B1 | * | 6/2018 | Katz ...................... G08G 1/017 |
| 10,417,908 | B2 | * | 9/2019 | Nicholson ................. G09F 7/20 |
| 2018/0144628 | A1 | * | 5/2018 | Nicholson ............... G09F 21/04 |
| 2018/0261088 | A1 | * | 9/2018 | Roy ........................ G08G 1/054 |
| 2020/0040537 | A1 | * | 2/2020 | Groeneweg ............. F41H 13/00 |

FOREIGN PATENT DOCUMENTS

| | | | | | |
|---|---|---|---|---|---|
| CA | 2986170 | A1 | * | 5/2018 | ............... E01F 9/40 |
| CN | 102163373 | A | * | 8/2011 | |
| CN | 103700268 | A | * | 4/2014 | |
| CN | 203759876 | U | * | 8/2014 | |
| CN | 105931476 | A | * | 9/2016 | |
| CN | 106023607 | A | * | 10/2016 | |
| CN | 205722442 | U | * | 11/2016 | |
| CN | 106920392 | A | * | 7/2017 | |
| CN | 206601804 | U | * | 10/2017 | |
| CN | 108657228 | A | * | 10/2018 | |
| CN | 109461325 | A | * | 3/2019 | ............... E01F 9/00 |
| CN | 109935092 | A | * | 6/2019 | |
| CN | 111241875 | A | * | 6/2020 | |
| CN | 111882899 | A | * | 11/2020 | ........... G05D 1/0646 |
| CN | 212411365 | U | * | 1/2021 | |
| CN | 113409596 | A | * | 9/2021 | |
| CN | 113643557 | A | * | 11/2021 | |
| CN | 215474799 | U | * | 1/2022 | |
| JP | 2003272092 | A | * | 9/2003 | |
| JP | 2004011183 | A | * | 1/2004 | |
| JP | 2004021772 | A | * | 1/2004 | |
| JP | 2004213524 | A | * | 7/2004 | |
| JP | 3978373 | B2 | * | 9/2007 | |
| JP | 2018092474 | A | * | 6/2018 | |
| WO | WO-2012002645 | A2 | * | 1/2012 | ........... G08G 1/0129 |
| WO | WO-2021222983 | A1 | * | 11/2021 | |

OTHER PUBLICATIONS

Land Transport Authority, "Code of Practice for Traffic Control at Work Zone", Land Transport Authority Jul. 2019 Edition, 98 pages.
Ron Vessey et al, "Work Zone Traffic Control Guidelines for Maintenance Operations", Washington State Department of Transportation, M54-44.09, May 2021, 98 pages.

* cited by examiner

SYNCHRONIZED WORK ZONE TRAFFIC MANAGEMENT SYSTEMS AND METHODS

BACKGROUND

Traffic flow in work zones can be logistically difficult to manage. Drivers may be frustrated when work zone traffic is not managed efficiently or safely. In some cases, managing single-lane work zones can involve individuals being placed on either end of a work zone to direct traffic. Often, these workers will carry a sign that can be used to indicate to traffic whether pass, or to stop. Traffic flowing in one direction is permitted to enter the single lane for a period of time while traffic flowing in the other direction is stopped. This schema is alternated from time to time to allow traffic flowing in the opposing direction to use the single lane. Such systems are inefficient and prone to error.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
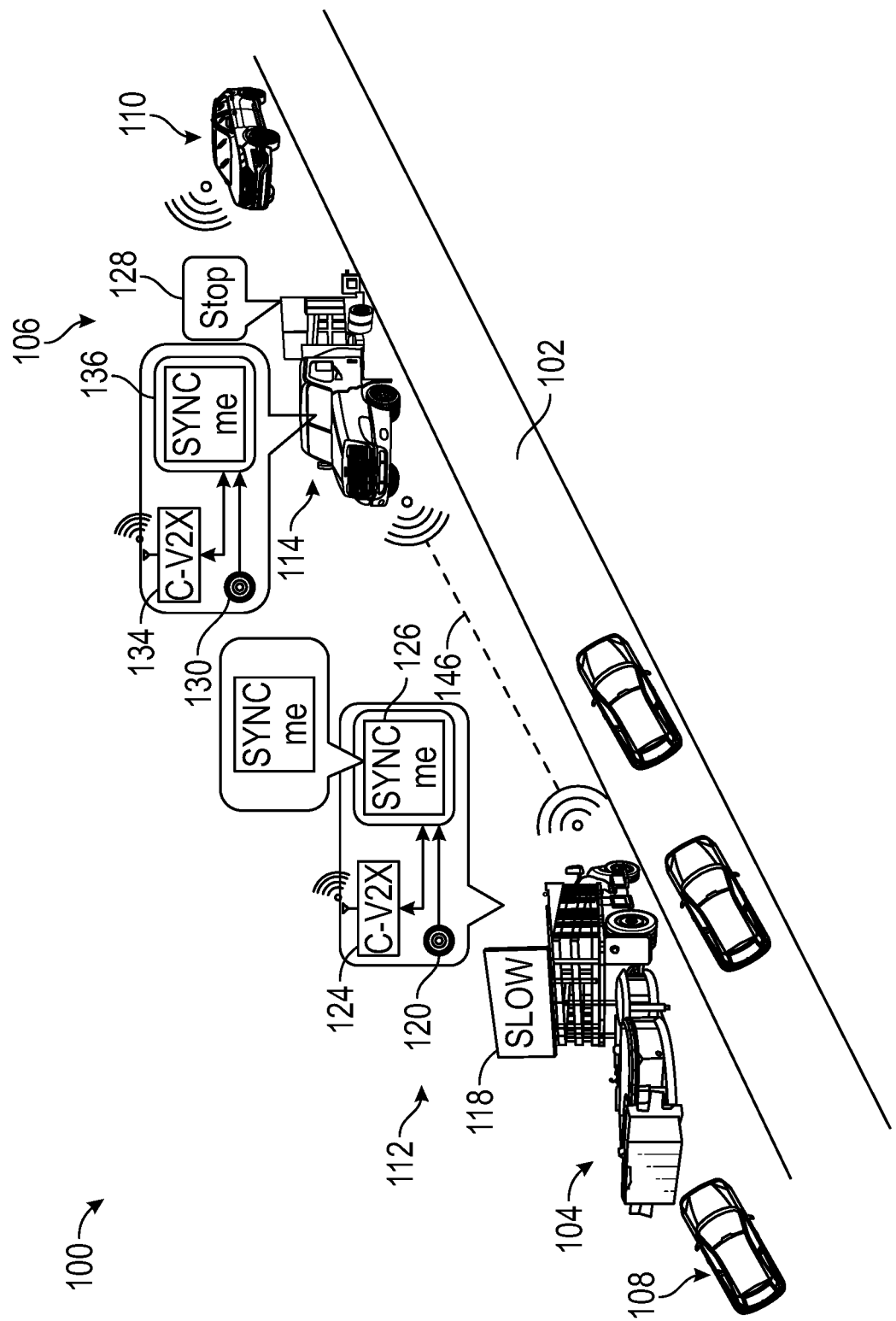
FIG. 1 illustrates an example architecture where the systems and method of the present disclosure may be practiced.

The present disclosure pertains to traffic control methods and systems for managing traffic flow through a single-lane work zone (for example, when there is construction on a road so only a one-way lane is available). An example involves using a work zone attenuator vehicle (could be a truck or a roadside infrastructure unit) at each end of the work zone to automatically control traffic flow. Examples provided herein may refer to trucks or attenuation trucks, but these descriptions are not intended to be limiting.

Two trucks can communicate with each other over a wireless link (such as a cellular vehicle-to-everything "C-V2X"). Each truck can be equipped with a camera to monitor the traffic and the two trucks work together to change a slow/stop sign connected to the trucks (to control the one lane of traffic on the road).

In general, external displays of the vehicles can be synchronized to operate in an alternating and opposing manner to control traffic flow through a single-lane work zone. That is, when one vehicle is displaying one message, the other vehicle is displaying a different message. The messages displayed can flip-flop back and forth according to a schedule or based on other metrics such as traffic volume.

A human-machine interface (HMI) in each of the trucks has a synchronization function "SYNC-ME" for work zone traffic control. Pressing a "SYNC-ME" button in both trucks may initiate synchronization process between two vehicles.

In one example use case, one truck sends "SYNC-ME request" message to the other truck. The other truck receives "SYNC-ME request" message, and replies with "SYNC-ME acknowledged" message back. The first truck receives the "SYNC-ME acknowledged" message. Both trucks repeat sending "SYNC-ME check" message to the other vehicle, and replies "SYNC-ME check ACK" message to keep both trucks synchronized. One truck starts to change its display to "SLOW", the other truck starts to change its display to "STOP".

In some instances, a timer (configurable, e.g. three minutes) can be started when the display change begins. Upon the timer expired, the "SLOW" message is changed to "STOP". Then, after the last vehicle has passed the zone, the other direction display can be changed to "SLOW". The "SLOW" time can be adjusted to favor the direction with heavier traffic. Vehicles approaching to the work zone may be equipped with C-V2X and may transmit a request to the truck. The truck can then check the volume of vehicles on both sides and can adjust the "SLOW"/"STOP" message presentation accordingly. The truck can also use its camera to determine the volume of vehicles in each side. A vehicle can also send an "EMERGENCY" message to the truck to request changing to "SLOW" as soon as possible. Alternatively, the interval of "STOP" to "SLOW" time period can be configured based on the zone distance, for example, one minute to allow the slow traffic to clear before the other direction traffic starts to enter the work zone.

While messages such as "SLOW"/"STOP" can be used, other signals or messages such as traffic lights: red/green/orange, with counting downtime left can be as well. The two attenuator trucks can periodically send alive messages to maintain the synchronization. If ever one truck fails to receive "ACK" message from the other, or two trucks are out-of-synch, the HMI of each truck can change their display to "STOP" to avoid a collision, and trigger an alarm to workers to troubleshoot or re-start the synchronization process.

Illustrative Embodiments

Turning now to the drawings, FIG. 1 depicts an illustrative architecture 100 in which techniques and structures of the present disclosure may be implemented. The architecture 100 includes a single-lane work zone 102 with a first end 104 and a second end 106. A first set of traffic vehicles 108 can enter from the first end 104 and a second set of traffic vehicles 110 can enter from the second end 106. To mediate the flow of traffic through the single-lane work zone 102, two attenuator trucks are placed at opposing ends of the single-lane work zone 102. For example, a first vehicle 112 is placed at the first end 104 and a second vehicle 114 is placed at the second end 106.

Figure 2:
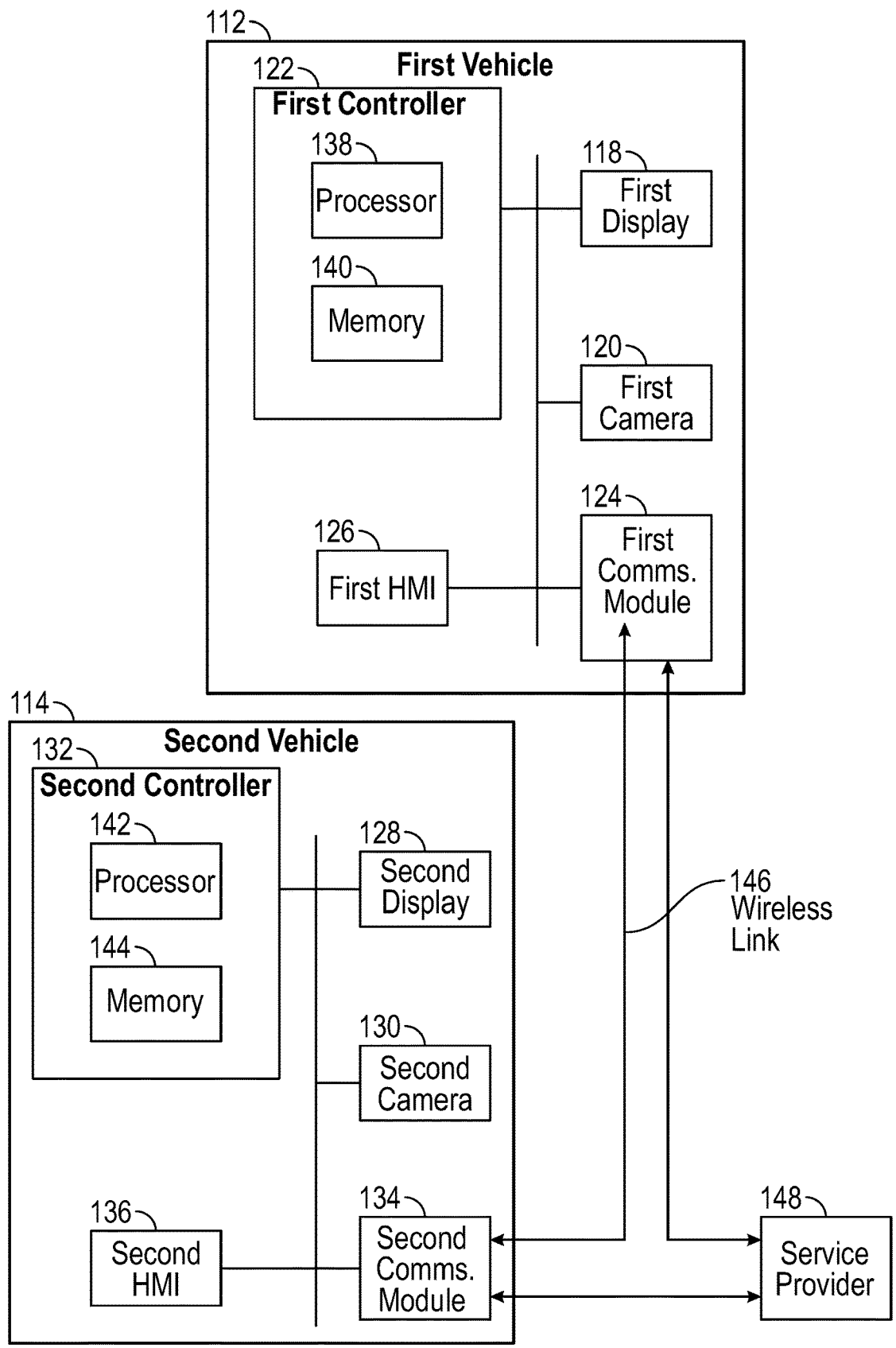
FIG. 2 illustrates schematically, aspects and components of FIG. 1.

Referring to FIGS. 1 and 2 collectively, the first vehicle 112 can comprise a first display 118, a first camera 120, a first controller 122 (see FIG. 2), a first communications module 124, and a first HMI 126. The second vehicle 114 is equally equipped with a second display 128, a second camera 130, a second controller 132 (see FIG. 2), a second communications module 134, and a second HMI 136.

The first controller 122 comprises a processor 138 and memory 140 for storing instructions. The processor 138 executes instructions stored in memory 140 to perform any of the methods disclosed herein. In general, the memory 140 can store synchronization and display logic, as well as other logic such as image recognition logic used to process images obtained by the first camera 120. When referring to actions performed by the first controller 122 or first vehicle 112, this implicitly involves the execution of instructions by the processor 138.

Likewise, the second controller 132 comprises a processor 142 and memory 144 for storing instructions. The processor 142 executes instructions stored in memory 144 to perform any of the methods disclosed herein. In general, the memory 144 can store synchronization and display logic, as well as other logic such as image recognition logic used to process images obtained by the second camera 130. When referring to actions performed by the second controller 132 or second vehicle 114, this implicitly involves the execution of instructions by the processor 142.

The first vehicle 112 and the second vehicle 114 can establish communication over a wireless link 146. That is the first vehicle 112 can transmit and receive data using the first communications module 124 over the wireless link 146, and the first vehicle 112 can transmit and receive data using the first communications module 124. In one example, a user in the first vehicle 112 can press a button associated with the first HMI 126 used to initiate a synchronization process. The synchronization process synchronizes communication between the first vehicle 112 and the second vehicle 114. The first vehicle 112 and the second vehicle 114 can utilize any suitable communications method or protocol, including any long-range or short-range wireless method.

As noted above, the first vehicle 112 sends "SYNC-ME request" message to the second vehicle 114. The second vehicle 114 receives "SYNC-ME request" message, and replies with "SYNC-ME acknowledged" message back. The first vehicle 112 receives the "SYNC-ME acknowledged" message. Both vehicles repeat sending "SYNC-ME check" message to the other vehicle in a hand-shake procedure, and replies "SYNC-ME check ACK" message to keep both trucks synchronized. When synchronization of communication is disrupted or fails, various remediation measures can be undertaken, as will be disclosed in greater detail herein. When synchronization is complete, an indication can be provided on both the first HMI 126 and the second HMI 136. For example, the button that was depressed to initiate synchronization may alternate from a first hue to a second hue, such as from orange to green, or the text changed to "SYNCED", indicating successful synchronization. A similar display can be presented on the second HMI 136 of the second vehicle 114.

Also, the first controller 122 and the second controller 132 can be configured to periodically exchange synchronization messages with one another to confirm that the vehicles are synchronized in their communications. The first controller 122 can transmit SYNC messages according to a predetermined schedule and the second controller 132 can respond with an ACK message. Again, warnings can be transmitted when synchronization fails as will be discussed in greater detail herein.

Once the first vehicle 112 and the second vehicle 114 are in synchronized communication with one another, a process of alternatingly displaying messages can begin. In one use case, two different messages can be displayed. A first message indicates to drivers to drive slowly into the work zone 102 and a second message indicates to drivers to stop and not enter the work zone 102. In the example of FIG. 1, the first vehicle 112 displays the first message "SLOW" to the first set of traffic vehicles 108, while the second vehicle 114 displays the second message "STOP" to the second set of traffic vehicles 110.

In more detail, the first controller 122 can choose to display the first message on the first display 118. The first controller 122 can transmit a signal to the second controller 132 over the wireless link 146 that indicates whether the first controller 122 chose the first message or the second message. In some instances, the first controller 122 can behave as a primary controller while the second controller 132 acts as a subordinate controller. However, these roles can be reversed as desired. In another example, the first controller 122 can be configured to always initiate with the first message after synchronization, while the second controller 132 is configured to always initiate with the second message after synchronization. Again, these configurations can be reversed as desired.

In one example use case, when one truck is displaying the second message "STOP", the truck can determine the last vehicle entering using the camera. The truck can transmit a message to the other truck regarding the last vehicle. This could include an image of the last vehicle or a license plate, which can be identified using images obtained by the camera of the first or second truck. The other truck waits for the last vehicle to pass through the work zone before changing the display message from "STOP" to "SLOW" (e.g., switching from the second message to the first message).Regardless, the display and switching of messages can be managed using an alternating schema. As will be discussed herein with examples, the alternating schema can be time-based, based on traffic flow volume, and/or combinations thereof.

With regard to a time-based process, when the first controller 122 begins to display the first message on the first display 118, the first controller 122 can initiate a timer. The timer can be set to any duration, such as three minutes. When the timer expires, the first controller 122 can switch messages from the first message to the second message. In one example, the first controller can also transmit a signal to the second controller 132 that informs the second controller to switch from the second message to the first message. In other instances, the second controller 132 can also maintain a timer that is synchronized with the timer used by the first controller 122. Thus, at the expiration of the timer, the second controller 132 can switch from the second message to the first message, or vice-versa.

In some instances, the first controller 122 can be configured to determine a time period for the alternating schema. The first controller 122 can cause the first external display 118 to present the first message for a first count of the time period, before switching to the second message for a second count of the time period. The first count and the second count can be independently configured. For example, the first count can be three minutes, with the second count being two minutes. Thus, the first display 118 will display the first message for three minutes and the first display 118 will subsequently display the second message for two minutes. This implicitly means that the second display 128 displays the first message for two minutes and the second message for three minutes. The selection of duration or length for the periods of the time frame can be based on historical data or can be determined from real-time or near-real-time traffic flow volume.

With regard to traffic flow volume, the first controller 122 can obtain images from the first camera 120. The first controller 122 can evaluate the images using image recognition logic to determine a volume of the first set of traffic vehicles 108 at the first end 104. The first controller 122 can also obtain images from the second controller 132. Similarly, the second controller 132 can obtain images from the second camera 130. The first controller 122 can evaluate the images using image recognition logic to determine a volume of the second set of traffic vehicles 110 at the second end 106. For example, the first controller 122 can be configured to identify and count the numbers of vehicles in both the first set of traffic vehicles 108 and the second set of traffic vehicles 110.

When the volume of the traffic of the first set of traffic vehicles 108 is greater than the volume of the traffic of the second set of traffic vehicles 110, the first controller 122 can select a duration for the first period that is greater than a duration for the second period. This allows the two vehicles to load balance traffic flow through the work zone 102 based on volume.

In yet another example, the volume of traffic can be assessed based on communications received from vehicles in the first set of traffic vehicles 108 or the second set of traffic vehicles 110. For example, vehicles in the first set of traffic vehicles 108 can transmit or broadcast V2X (vehicle to everything) status messages that can be received by the first controller 122. The first controller 122 can count the number of beacon messages received from the first set of traffic vehicles 108 to infer to determine traffic flow volume. The second controller 132 can be similarly configured to receive messages from the second set of traffic vehicles 110 and relay these messages to the first controller 122 over the wireless link 146. In some instances, the second controller 132 can also be configured to count the number of beacon messages received from the second set of traffic vehicles 110 to infer to determine traffic flow volume and relay this count to the first controller 122. Using the traffic flow information, the first controller 122 can be configured to adjust the duration of time periods for displaying and switching messages.

Also, the interval for switching between messages by both the first vehicle and the second vehicle can be based on a length of the work zone 102. For example, when the work zone is 500 yards, the time frame can be shorter than when the work zone is two miles long. In the second example, the increased length of the work zone may involve a longer period of time as it takes vehicles longer to traverse the work zone. Thus, as the length of the work zone increases, so does the time frame for displaying the messages before switching.

In some instances, the first controller 122 may lose synchronization of communication with the second controller 132. In these instances, the first controller 122 and the second controller 132 can each be configured to display the second message "STOP" at the same time. The controllers can continue to present the second message until synchronization is reestablished. If synchronization cannot be reestablished, the first controller 122 and/or the second controller 132 can transmit an alarm or warning to users or operators of the attenuator vehicles to request service. The alarm or warning could be transmitted to a mobile device or other similar computing device used by an operator. In some instances, the alarm or warning could be transmitted over a network to a service provider 148. The service provider 148 can dispatch repair personnel to fix the synchronization issues. Also, workers can be deployed to manually direct traffic during this period by the service provider 148.

In some instances, traffic vehicles may have an emergency and require expedited passage through the work zone. For example, one vehicle in the first set of traffic vehicles 108 is experiencing an emergency. The vehicle can transmit an "EMERGENCY" message that is received by the first controller 122. If the first display 118 is presenting the second message, the first controller 122 can transmit a message to the second controller 132 to immediately switch to the second message on the second display 128. The first controller 122 can determine through camera images when the last vehicle that was permitted by the second vehicle to enter the work zone 102 has passed the first vehicle. Once this last vehicle has passed, the first controller 122 can immediately switch to the first message. Again, the second controller 132 can be configured to perform this method when obtaining emergency messages from vehicles in the second set of traffic vehicles 110. Alternatively, the second controller 132 can forward emergency messages to the first controller 122 to orchestrate the process.

In sum, the first controller 122 and/or the second controller 132 can receive an emergency message from a traffic vehicle traveling in either the first direction or the second direction, as well as adjust the alternating schema to allow the traffic vehicle to access the one-way street.

Figure 3:
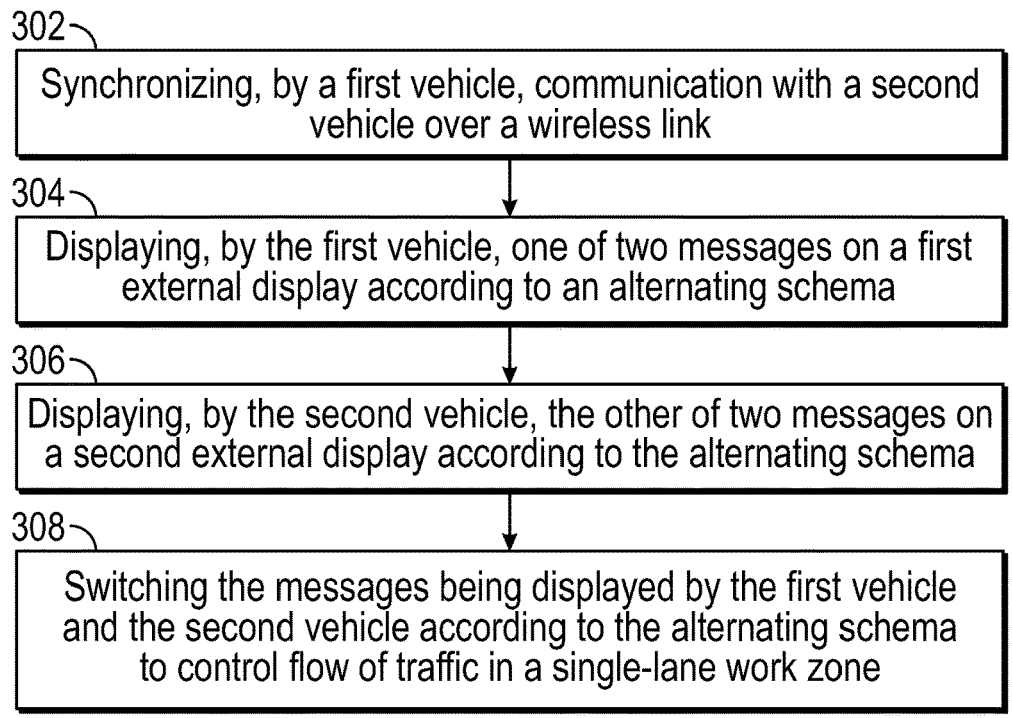
FIG. 3 is a flowchart of an example method of the present disclosure.

FIG. 3 is a flowchart of an example method of the present disclosure. The method can include a step 302 of synchronizing, by a first vehicle, communication with a second vehicle over a wireless link. Once synchronization of communication has been established, the method can include a step 304 of displaying, by the first vehicle, one of two messages on a first external display according to an alternating schema. A first message indicates to drivers to drive slowly and a second message indicates to the drivers to stop.

The first vehicle can cause the first message to be displayed on the first external display when a second vehicle is displaying the second message on a second external display. Thus, the method can include a step 306 of displaying, by the second vehicle, the other of two messages on a second external display according to the alternating schema.

The method can also include a step 308 of switching the messages being displayed by the first vehicle and the second vehicle according to the alternating schema. Thus, the first vehicle and the second vehicle can alternatingly display either the first or second messages. Thus, the first vehicle can display the second message on the first external display when the second vehicle is displaying the first message on the second external display. This type of alternating display of the first and second messages can be used to control the flow of traffic in a single-lane work zone, the traffic entering from both a first direction and a second direction. The first vehicle manages traffic entering from the first direction and the second vehicle manages traffic entering from the second direction.

Figure 4:
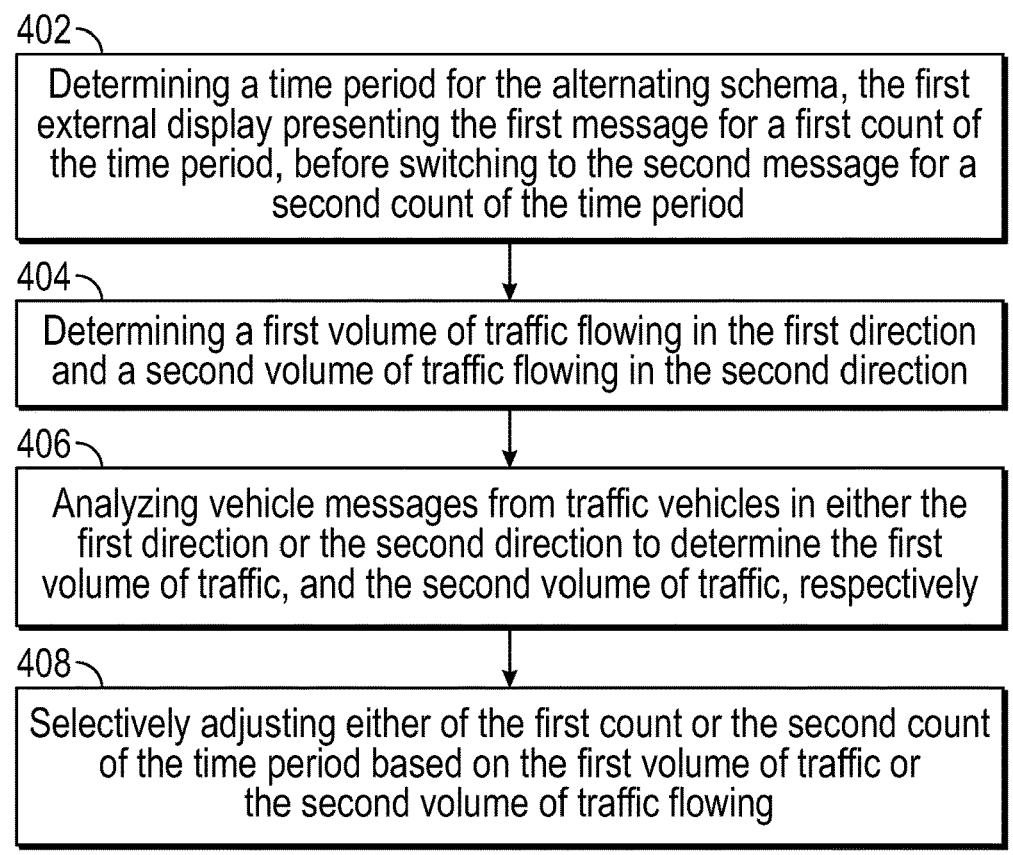
FIG. 4 is a flowchart of another example method of the present disclosure.

FIG. 4 is a flowchart of another example method that can include a step 402 of determining a time period for the alternating schema, the first external display presenting the first message for a first count of the time period, before switching to the second message for a second count of the time period. Thus, the time period can be separated into two or more periods. It will be understood that the duration of each of the periods can be tuned due to dynamic information such as real-time traffic flow, or statically where the periods are fixed and determined in advance.

The method can also include a step 404 of determining a first volume of traffic flowing in the first direction and a second volume of traffic flowing in the second direction. As noted above, this volume information can be determined from images obtained by one or more cameras and/or can be based on beacon messages transmitted by connected vehicles in the traffic flow. Thus, the first volume of traffic can be determined based on camera images obtained from a first camera associated with the first vehicle, while the second volume of traffic can be determined on camera images obtained from a second camera associated with the second vehicle.

In some instances, the method can include a step 406 of analyzing vehicle messages from traffic vehicles in either the first direction or the second direction to determine the first volume of traffic, and the second volume of traffic, respectively. The method can include a step 408 of selectively adjusting either of the first count or the second count of the time period based on the first volume of traffic or the second volume of traffic flowing.

As noted above, a time period of the alternating schema is based on a length of the work zone. As the length of the work zone increases, a time period for the alternating schema can increase.

Figure 5:
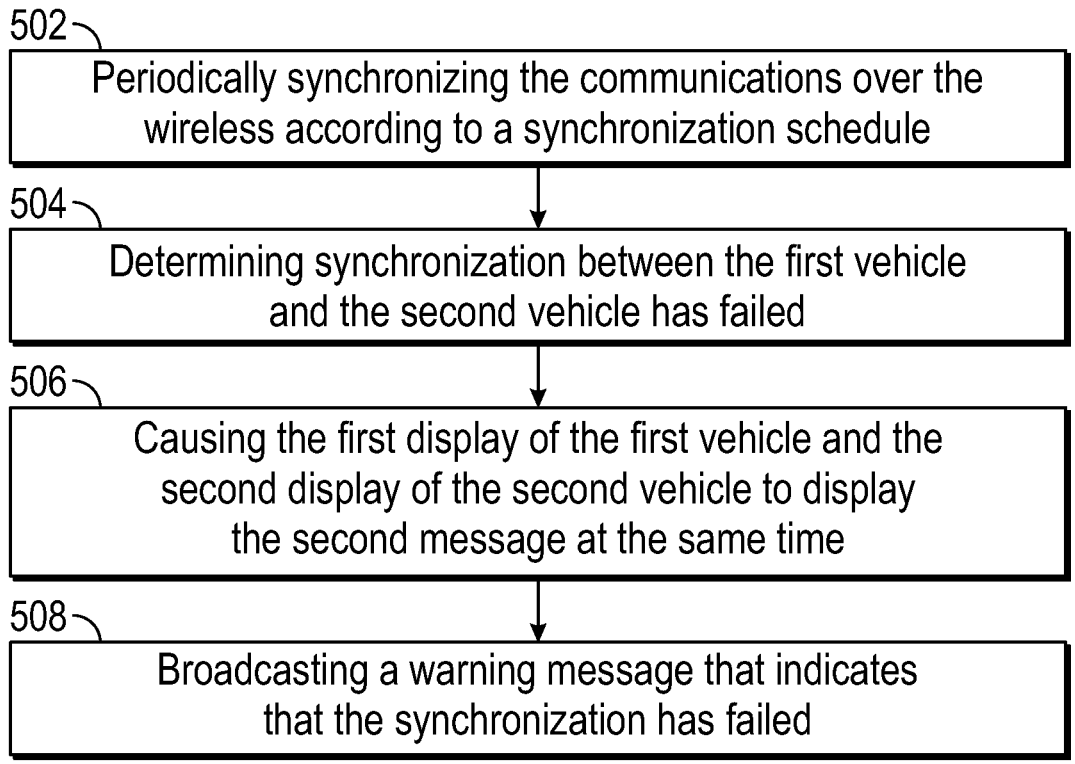
FIG. 5 is a flowchart of yet another example method of the present disclosure.

FIG. 5 is a flowchart of yet another example method. The method can include a step 502 of periodically synchronizing the communications over the wireless according to a synchronization schedule. The method can also include a step 504 of determining synchronization between the first vehicle and the second vehicle that has failed. For example, network connectivity may be interrupted. In another example, if one of the attenuator vehicles is hit or has a mechanical or electrical failure, connectivity may be interrupted.

The method can include a step 506 of causing the first display of the first vehicle and the second display of the second vehicle to display the second message at the same time. As noted above, each of the vehicles can be independently configured to display the STOP message when synchronization fails. Thus, both vehicles can also be independently configured to determine a lack of synchronization. The method can also include a step 508 of broadcasting a warning message that indicates that the synchronization has failed.

Figure 6:
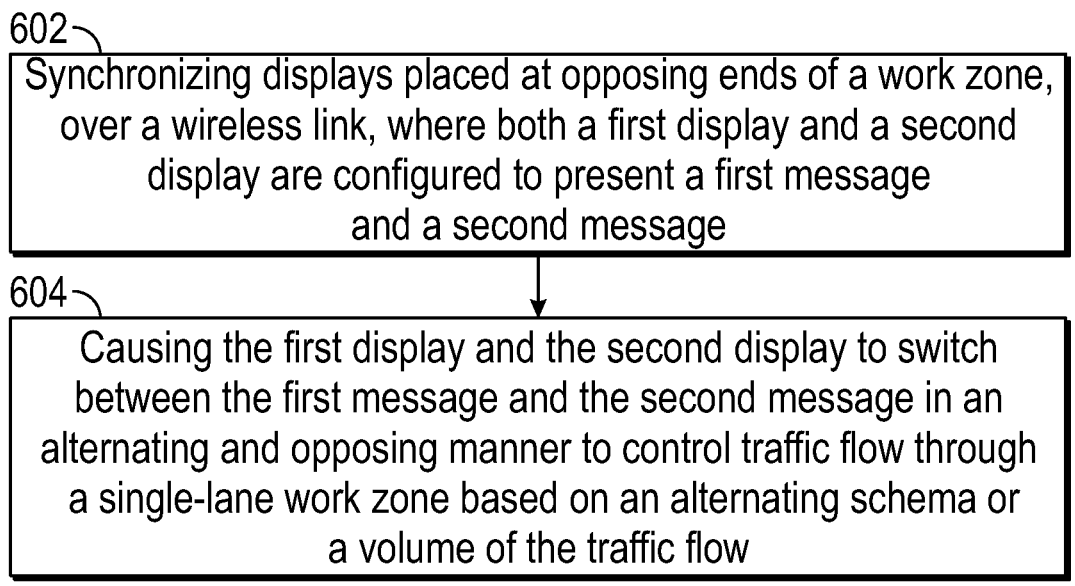
FIG. 6 is a flowchart of an alternative method of the present disclosure.

FIG. 6 illustrates another example method that can include a step 602 of synchronizing displays placed at opposing ends of a work zone, over a wireless link. It will be understood that both a first display and a second display are configured to present a first message and a second message. The method can also include a step 604 of causing the first display and the second display to switch between the first message and the second message in an alternating and opposing manner to control traffic flow through a single-lane work zone based on an alternating schema or a volume of the traffic flow.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
executing a hand-shake procedure for synchronizing communication between a first vehicle and a second vehicle, the hand-shake procedure comprising a synchronization request message that is wirelessly transmitted by the first vehicle to the second vehicle, and an acknowledgement message that is wirelessly received by the first vehicle from the second vehicle in response to the synchronization request message;
displaying, by the first vehicle, a first message on a first external display of the first vehicle according to a schema; and
displaying, by the second vehicle, a second message on a second external display of the second vehicle,
wherein the first and second messages are configured to control a flow of traffic on a road, and wherein the flow of traffic traverses the road from a first direction and a second direction.

2. The method according to claim 1, further comprising determining a time period for the schema, the first external display presenting the first message for a first count of the time period, before switching to the second message for a second count of the time period.

3. The method according to claim 2, further comprising:
determining a first volume of traffic flowing in the first direction and a second volume of traffic flowing in the second direction; and
selectively adjusting either of the first count or the second count of the time period based on the first volume of traffic or the second volume of traffic flowing.

4. The method according to claim 1, further comprising placing the first vehicle at a first end of a work zone and the second vehicle at a second end of the work zone, and determining a time period of the schema based on a length of the work zone.

5. The method according to claim 1, further comprising:
    determining synchronization between the first vehicle and the second vehicle has failed;
    causing the first external display of the first vehicle and the second external display of the second vehicle to display the second message simultaneously; and
    broadcasting a warning message that indicates that the synchronization has failed.

6. The method according to claim 5, further comprising:
    receiving an emergency message from a traffic vehicle traveling in either the first direction or the second direction; and
    adjusting the schema to allow the traffic vehicle to access the road.

7. The method of claim 1, wherein the hand-shake procedure is executed via vehicle-to-everything (V2X) wireless communications.

8. The method of claim 1, further comprising:
    placing the first vehicle at a first end of a work zone on the road and the second vehicle at a second end of the work zone;
    capturing, by the second vehicle, identification information of a last vehicle entering the work zone;
    transmitting, by the second vehicle, to the first vehicle, the identification information of the last vehicle;
    verifying, by the first vehicle, that the last vehicle has passed the work zone;
    changing, by the first vehicle, the first message; and
    changing, by the second vehicle, the second message, after verifying, by the first vehicle, that the last vehicle has passed the work zone.

9. The method of claim 8, wherein capturing, by the second vehicle, identification information of the last vehicle comprises capturing an image of a license plate of the last vehicle,
    wherein transmitting, by the second vehicle, to the first vehicle, the identification information of the last vehicle comprises transmitting the image of the license plate,
    and further wherein verifying, by the first vehicle, that the last vehicle has passed the work zone comprises evaluating the image of the license plate of the last vehicle.

10. The method of claim 1, further comprising:
    providing, in the first vehicle, a visual indication of a successful synchronization upon receiving the acknowledgement message from the second vehicle, the visual indication comprising at least one of a message displayed on a human machine interface in the first vehicle or a change in color of a button that is operable to transmit the synchronization request message.

11. A first vehicle, comprising:
    a first external display
    a first communications module; and
    a first controller comprising a processor and a memory, the memory storing instructions that are executed by the processor to:
        execute a hand-shake procedure to synchronize communication with a second vehicle over a wireless link through the first communications module, the hand-shake procedure comprising a synchronization request message that is wirelessly transmitted by the first communications module to the second vehicle and receiving an acknowledgement message wirelessly transmitted by the second vehicle to the first vehicle in response to the synchronization request message; and
        alternatingly display one of two messages on the first external display according to an alternating schema, wherein a first message indicates to drivers to drive slowly and a second message indicates to the drivers to stop, the first message being displayed on the first external display when the second vehicle is displaying the second message on a second external display, the first vehicle displaying the second message on the first external display when the second vehicle is displaying the first message on the second external display so as to control a flow of traffic on a road, the flow of traffic traversing the road from both a first direction and a second direction.

12. The first vehicle according to claim 11, wherein the first controller is configured to transmit to the second vehicle an indication that the first vehicle is displaying the first message or the second message.

13. The first vehicle according to claim 11, wherein the first controller is configured to determine a time period for the alternating schema, the first external display presenting the first message for a first count of the time period, before switching to the second message for a second count of the time period.

14. The first vehicle according to claim 13, wherein the first controller is configured to:
    determining a first volume of traffic flowing in the first direction and a second volume of traffic flowing in the second direction;
    selectively adjusting either of the first count or the second count of the time period based on the first volume of traffic or the second volume of traffic flowing; and
    analyze vehicle messages from traffic vehicles in either the first direction or the second direction to determine the first volume of traffic, and the second volume of traffic, respectively.

15. The first vehicle according to claim 14, wherein the first controller is configured to determine the first volume of traffic based on camera images obtained from a first camera associated with the first vehicle; and the second volume of traffic based on camera images obtained from a second camera associated with the second vehicle.

16. The first vehicle according to claim 11, wherein the first controller is configured to place the first vehicle at a first end of a work zone and the second vehicle at a second end of the work zone, wherein a time period of the alternating schema is based on a length of the work zone.

17. The first vehicle according to claim 11, wherein the first controller is configured to:
    periodically synchronize the communication over the wireless link according to a synchronization schedule;
    determine synchronization between the first vehicle and the second vehicle has failed;
    cause the first external display of the first vehicle and the second external display of the second vehicle to display the second message simultaneously; and
    broadcast a warning message that indicates that the synchronization has failed.

* * * * *